US006484886B1

(12) United States Patent  (10) Patent No.: US 6,484,886 B1
Isaacs et al.  (45) Date of Patent: Nov. 26, 2002

(54) FEEDER READER SUBSYSTEM

(75) Inventors: Gerald A. Isaacs, Arlington, TX (US); James M. Pippin, Keller, TX (US); Stephen T. Kugle, deceased, late of Arlington, TX (US), by Mitchell H. Kugle, legal representative; George M. Mondie, Bedford, TX (US); M. Wayne Neff, Dallas, TX (US)

(73) Assignee: Siemens Dematic Postal Automation, L.P., Arlington, TX (US)

( * ) Notice: Subject to any disclaimer, the term of this patent is extended or adjusted under 35 U.S.C. 154(b) by 0 days.

(21) Appl. No.: 09/707,464

(22) Filed: Nov. 7, 2000

Related U.S. Application Data

(63) Continuation of application No. 09/560,235, filed on Apr. 28, 2000, now Pat. No. 6,401,936.
(60) Provisional application No. 60/131,734, filed on Apr. 30, 1999.

(51) Int. Cl.$^7$ .............................. B07C 5/02; B65G 47/26
(52) U.S. Cl. ...................... 209/539; 209/583; 209/586; 209/656; 209/592; 209/918; 198/368; 198/457.02
(58) Field of Search ................................ 209/539, 583, 209/586, 587, 592, 656, 918; 198/368, 370.01, 370.02, 457.02, 785

(56) References Cited

U.S. PATENT DOCUMENTS

| | | | | |
|---|---|---|---|---|
| 2,728,466 A | * | 12/1955 | Postlewaite et al. | 214/11 |
| 3,552,541 A | * | 1/1971 | Riggs et al. | 198/127 |
| 3,608,713 A | * | 9/1971 | Crosby et al. | 209/74 |
| 3,612,250 A | * | 10/1971 | Thompson | 198/38 |
| 3,880,751 A | * | 4/1975 | Wirth | 209/125 |
| 3,913,730 A | * | 10/1975 | Gruodis et al. | 198/205 |
| 4,039,074 A | * | 8/1977 | Maxted | 198/456 |
| 4,466,529 A | * | 8/1984 | Thrandorf et al. | 198/368 |
| 4,598,815 A | * | 7/1986 | Adama | 198/372 |

(List continued on next page.)

FOREIGN PATENT DOCUMENTS

| | | | |
|---|---|---|---|
| FR | 2450127 | * | 5/1996 |
| GB | 2240530 A | * | 7/1991 |
| JP | 08198422 A | * | 8/1996 |
| WO | WO-98/33729 | * | 8/1998 |
| WO | 98/33729 | * | 8/1998 |

*Primary Examiner*—Tuan N. Nguyen
(74) *Attorney, Agent, or Firm*—Ed Jorgenson; Philip G. Meyers Law Office

(57) ABSTRACT

In one embodiment, an article sorting system includes successive coarse and fine singulators and a recirculating loop for processing a disordered stream of items including three-dimensional non-flat articles. A coarse singulator includes cascaded ramped conveyors, preferably operating at progressively greater speeds. A detection system, such as a vision system, for monitoring the stream of articles and identifying and/or tracking individual items passing through the system is used in conjunction with a fine singulator such as a chevron, hold-and-release or strip conveyor downstream from the coarse singulator. A control system is utilized in connection with the vision system to regulate the flow of articles through the system by, for example, diverting doubles or clusters for separations. A method of sorting articles includes steps of singulating a disordered stream of items with multiple singulating steps including a coarse singulating step for mechanically increasing the spacing between items in the stream, and a fine singulating step in which individual items are monitored and/or identified and tracked as they traverse the system. A divert apparatus which can be provided for diverting oversize/overweight articles or unwanted clusters of unsingulated articles includes an angled roller conveyor and a gate for discharging articles from the stream of articles to be processed.

18 Claims, 11 Drawing Sheets

U.S. PATENT DOCUMENTS

| | | | | |
|---|---|---|---|---|
| 4,687,106 A | * | 8/1987 | Prins | 209/552 |
| 4,732,259 A | * | 3/1988 | Yu et al. | 198/368 |
| 4,895,246 A | * | 1/1990 | Rizzi | 198/463.4 |
| 4,940,536 A | * | 7/1990 | Cowlin et al. | 209/592 |
| 5,325,972 A | * | 7/1994 | Prydtz et al. | 209/583 X |
| 5,400,896 A | * | 3/1995 | Loomer | 198/415 |
| 5,460,271 A | * | 10/1995 | Kenny et al. | 209/576 |
| 5,501,315 A | * | 3/1996 | Loomer | 198/445 |
| 5,632,381 A | * | 5/1997 | Thust et al. | 209/44.1 |
| 5,655,667 A | * | 8/1997 | Isaacs | 209/539 |
| 5,738,202 A | * | 4/1998 | Ydoate et al. | 198/460.1 |
| 6,015,039 A | * | 1/2000 | Bonnet | 198/368 |
| 6,076,653 A | * | 6/2000 | Bonnet | 198/370.09 |
| 6,076,683 A | * | 6/2000 | Okada et al. | 209/583 X |
| 6,076,684 A | * | 6/2000 | Bollegraaf | 209/668 |

\* cited by examiner

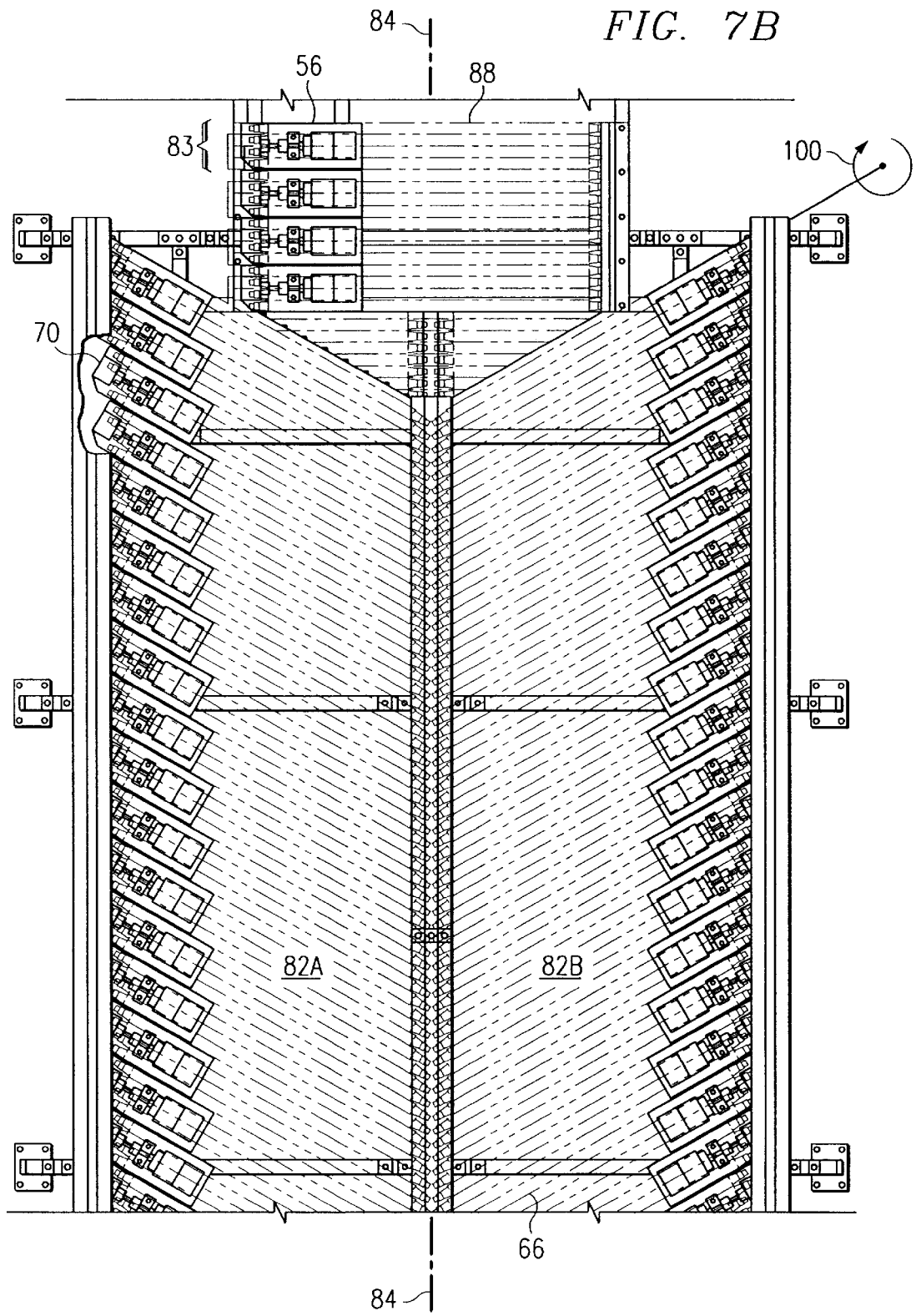

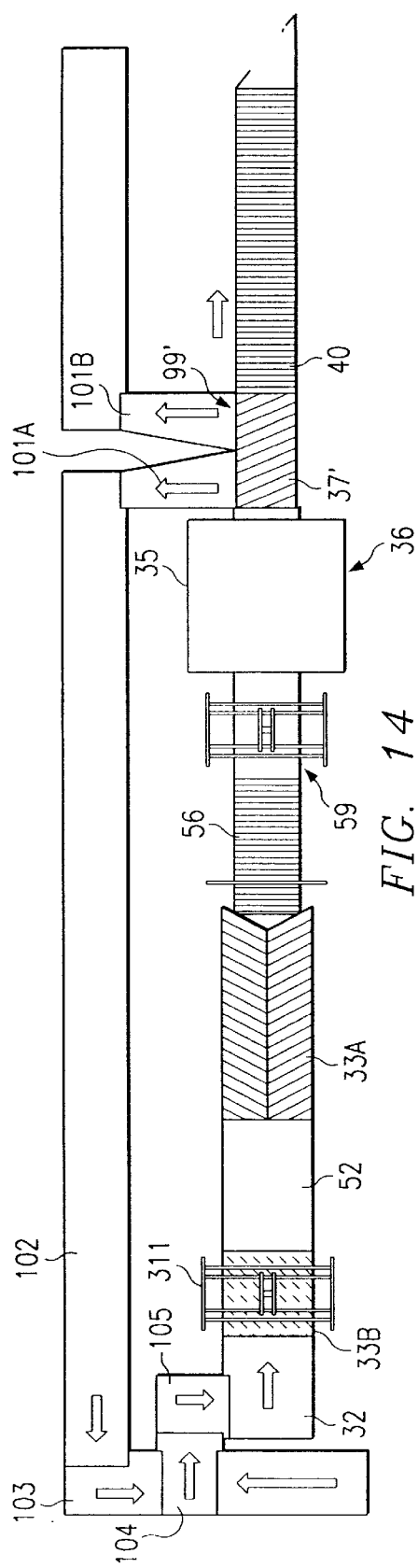
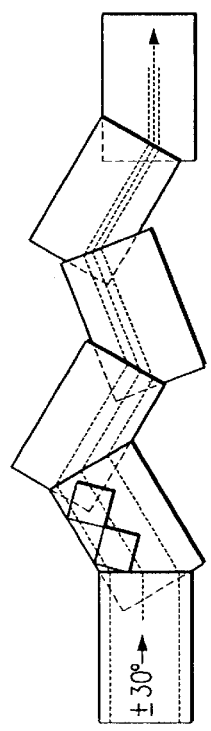
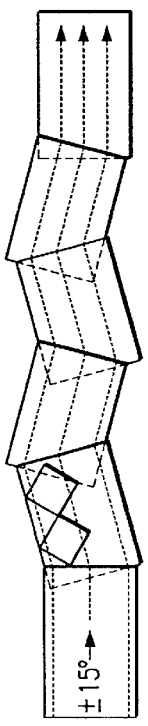
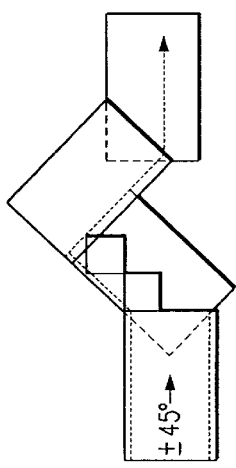
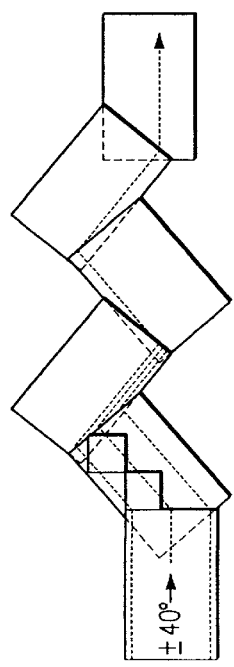

FEEDER READER SUBSYSTEM

RELATED APPLICATIONS

This application is a continuation of U.S. application Ser. No. 09/560,235, filed Apr. 28, 2000, now U.S. Pat. No. 6,401,936, with is a conversion of provisional U.S. application Ser. No. 60/131,734, filed Apr. 30, 1999, which are relied upon for priority and which are incorporated herein by reference for all purposes.

FIELD OF THE INVENTION

The invention relates to a method and apparatus for feeding items such as mail pieces into a sorting system, which system includes subsystems for singulation of mail pieces such as parcels.

BACKGROUND OF THE INVENTION

In high volume product handling operations, such as mail handling and similar processing, large quantities of items such as boxes, parcels packages or parts often varying widely in size, must be inducted into a sorter systems. Typically, a feeder system for use in such processing areas takes a disordered stream of items fed to it on a conveyor and inducts the items onto a sorter system. The feeder system ideally should perform several functions. To the maximum extent possible, the feeder should singulate disordered items in order to present the articles to downstream processing equipment, such as a sorter, one at a time with a minimum specified spacing or separation between product items. The feeder system must also read destination information from the item so that the control system for the sort can track it through the system and sort it correctly. In the U.S., scannable bar codes are used for this purpose. A third important function is intercepting and removing items which are non-machinable because they are too large, too heavy or the like from the system for special handling.

Singulation is an essential first step in the handling and sorting product items such as boxes, parcels or soft packages. Singulation is a process whereby a randomly input stream of items moving on a conveyor system is separated into a stream of single items spaced from each other so that an downstream process can readily perform operations on each item one at a time. Mixed item streams are a particular challenge in that a mixed material stream may include packages that vary greatly in size and may be piled at random one upon another, forming agglomerates of packages that are difficult to detect and separate.

According to one previously proposed method for singulation of mail, an inclined ramp with holes for applying suction is provided. Letters are allowed to slide down the ramp and then suction is applied to hold them in place on the slide. The suction is then selectively released in order to release one item at a time. See Interim Report For Phase I, U.S. Postal Service Contract 104230-85-H-0002, Apr. 5, 1985, ElectroCom Automation, Inc., pages 3–10 to 3–13. This method provides one form of singulation, but is of doubtful utility for larger items that may be difficult to hold effectively using suction and that may tend to tumble down a slide, possibly evading the effect of suction and leaving the singulator prematurely. The system according to the present invention addresses these difficulties.

The invention further provides a variety of innovations useful in sorting system as described in the summary and detailed description which follow.

SUMMARY OF THE INVENTION

In accordance with one aspect of the invention, a system for feeding items to a sorter includes a first conveyor that conveys a stream of items to be sorted, a mechanical singulator that receives the stream of items from the conveyor and singulates the items, an automated system for detection and removal from the stream items which exceed predetermined physical limitations associated with the sorter, a scanner for reading destination indicia on each item, a second conveyor for conveying each item for induction to the sorter, and optionally a labeler that labels each item with a label readable by the sorter, which label identifies a sorting destination that corresponds to the read destination indicia.

Such a system in accordance with one embodiment of the invention includes a first singulator section having an infeed end that receives a disordered stream of non-flat, three-dimensional articles, at least one conveyor, and a system associated with the conveyor for mechanically increasing spacing between the articles moving along the conveyor without need to track positions of individual articles on the conveyor. A second singulator section includes at least one conveyor, a detection system that identifies individual articles as each passes through the second singulator section, and a control system that selectively actuates portions of the conveyor of the second section in response to position data from the detection system to remove articles from the second singulator one at a time.

An article sorting method for feeding items to a sorter according to the invention comprises the steps of conveying a stream of items such as mail pieces on a conveyor to an automated singulator, singulating the items using the singulator, detecting and removing from the stream items which exceed predetermined physical limitations associated with the sorter, reading destination indicia on each item, and conveying each item for induction to the sorter for sorting in accordance with the read destination indicia. Each item may further be labeled with a label readable by the sorter, which label identifies a sorting destination that corresponds to the read destination indicia.

In another aspect, the invention comprises a singulation system including a first singulator section having an infeed end that receives a disordered stream of non-flat, three-dimensional articles, at least one conveyor, and a system associated with the conveyor for mechanically increasing spacing between the articles moving along the conveyor without need to track positions of individual articles on the conveyor. A second singulator section receives the stream of articles from the first singulator section, the second section including at least one conveyor and a detection system that identifies individual articles as the articles pass through the second singulator section. A control system selectively actuates portions of the conveyor of the second section in response to position data from the detection system in a manner effective to remove articles from the second singulator one at a time. The first singulator section may include first and second conveyors disposed end to end so that articles leaving the first conveyor are received by the second conveyor, the second conveyor moving at a greater speed than the first conveyor.

Such a two-stage singulation process may be characterized as successive coarse and fine singulation operations that improve singulation efficiency. For purposes of the present invention, "coarse" singulation refers to a mechanical process which tends to singulate a disordered stream of items by attenuation of the stream (increase in spacing between items) but which does not track items individually. "Fine" singulation refers to a process wherein individual items traversing the singulator are identified and/or tracked with a detection system such as a vision system, and controls are used to affect the stream in a manner that ensures or at least promotes singulation, for example, by diverting items back to ensure delivery of items from the system one at a time. Thus, a fine singulating step includes monitoring individual items traversing the system. Spacing of items in the disordered stream may be monitored with a detection system such as a vision system, and input from the vision system is used to control the system and to promote separation of items into an ordered one-by-one stream. The vision system may be used to identify and track individual items passing through the system.

Successive coarse and fine singulation operations are particularly useful for recycling and separating "doubles" or "multiples," namely two or more items in continuous material stream that are overlapping, side-by-side or consecutive without sufficient spacing. For this purpose, the coarse singulation step or section may fiter include a step of dropping items off of one conveyor and onto another in a manner that would tend to break up doubles, but of sufficiently short distance that damage to the items is minimal.

Thus, the invention provides a method of singulating a group of items includes the steps of introducing a disordered stream of items onto a coarse singulator which mechanically tends to increase spacing between items in the stream, and then passing the stream to a fine singulator wherein individual items are tracked with a detection system and controls are used to affect the stream in a manner that promotes singulation. As described in detail herein, the "fine" singulation may be accomplished with a chevron, hold-and-release or longitudinal strip conveyor. Alternatively, "coarse" singulation may be accomplished with a series of cascaded, e.g., ramped conveyors which, in one embodiment, may be angled in a horizontal plane relative to the preceding and/or succeeding conveyor. In one embodiment, one or more inclined conveyors comprising independently driven longitudinal conveying sections, such as parallel strip belts may be used for coarse singulation or, with the addition of a vision system and intelligent control, may be utilized for fine singulation.

In one embodiment, a coarse singulator includes at least one inclined conveyor, disposed at an angle of from about 5° to about 30°, for receiving a stream of articles to be singulated, including a lower article receiving area and upper article discharge end. A succeeding conveyor, preferably operated at a higher speed than the preceding conveyor, receives articles or items dropping from the discharge end of the preceding inclined conveyor. In one embodiment, one or more of the conveyors is positioned at an angle in the horizontal plane relative to the preceding conveyor at an angle from about 5° to about 90° to further promote singulation. The transfer process over the cascaded conveyors tends to break up or separate multiples or clusters of items and effect is increased if the succeeding conveyor is operated at a higher speed.

In another aspect, a coarse or fine singulating chevron-type conveyor includes a first conveyor section set at a first horizontal angle relative to a lengthwise conveying direction of the conveyor, and a second conveyor section set at a second horizontal angle relative to a lengthwise conveying direction of the conveyor. The first and second sections each extend in the lengthwise conveying direction of the conveyor and are positioned to cause items traveling on either section to move towards a central lengthwise axis of the conveyor while moving in the conveying direction of the conveyor. A control system may be provided for selectively operating the first and second conveyor sections in a manner that promotes singulation of items. In a preferred form, the first and second conveyor sections comprise groups of angled rollers, angled of from about 5° to 85° relative to a central axis of the conveyor. The rollers of the first and second conveyor sections each have separate drive systems whereby rollers of the first section can operate independently of rollers of the second section, and most preferably, subgroups of rollers within each section each have separate drive systems. At least one sensor, such as a digital camera may be provided to monitor the density of articles at one or more points in the system. Images captured by the camera may in turn be used to regulate the speed of one or more of the conveyors.

The invention further provides a recirculating singulation system. In this system, a conveyor conveys a stream of incoming items to a mechanical singulator that receives the stream of items from the conveyor and singulates the items. An automated system is provided for detecting insufficient spacing between items in the stream of items from the singulator. This system includes a controller for operating a divert mechanism that diverts an item identified by the automated detection system back to the stream of items on the conveyor for incoming items. An edging divert conveyor of the invention is a preferred form of divert mechanism for use in a recirculation loop. Such a divert mechanism includes an edger conveyor having angled rollers which convey items along a gate at one side of the edger conveyor. A return path such as a slide or chute leads from the gate to a conveyor for incoming items, or other destination. A control mechanism opens the gate to divert an item identified by the automated detection system for diversion, for example, along the return path back to the stream of items on the conveyor for incoming items. The recirculation loop may include a coarse singulation system only, a fine singulation system only, or both in series as described in the detailed description which follows.

BRIEF DESCRIPTION OF THE DRAWINGS

The invention will hereafter be described with reference to the accompanying drawings, wherein like numerals denote like elements, and:

FIGS. 7A and 7B are top plan views, partly broken away, of the chevron singulator of FIG. 2;

FIG. 14 is a schematic diagram of a recirculating singulation system according to an alternative embodiment of the invention; and FIGS. 15A–15D are schematic diagrams of zig-zag conveyor patterns according to the invention.

DETAILED DESCRIPTION OF PREFERRED EMBODIMENTS

Figure 1:
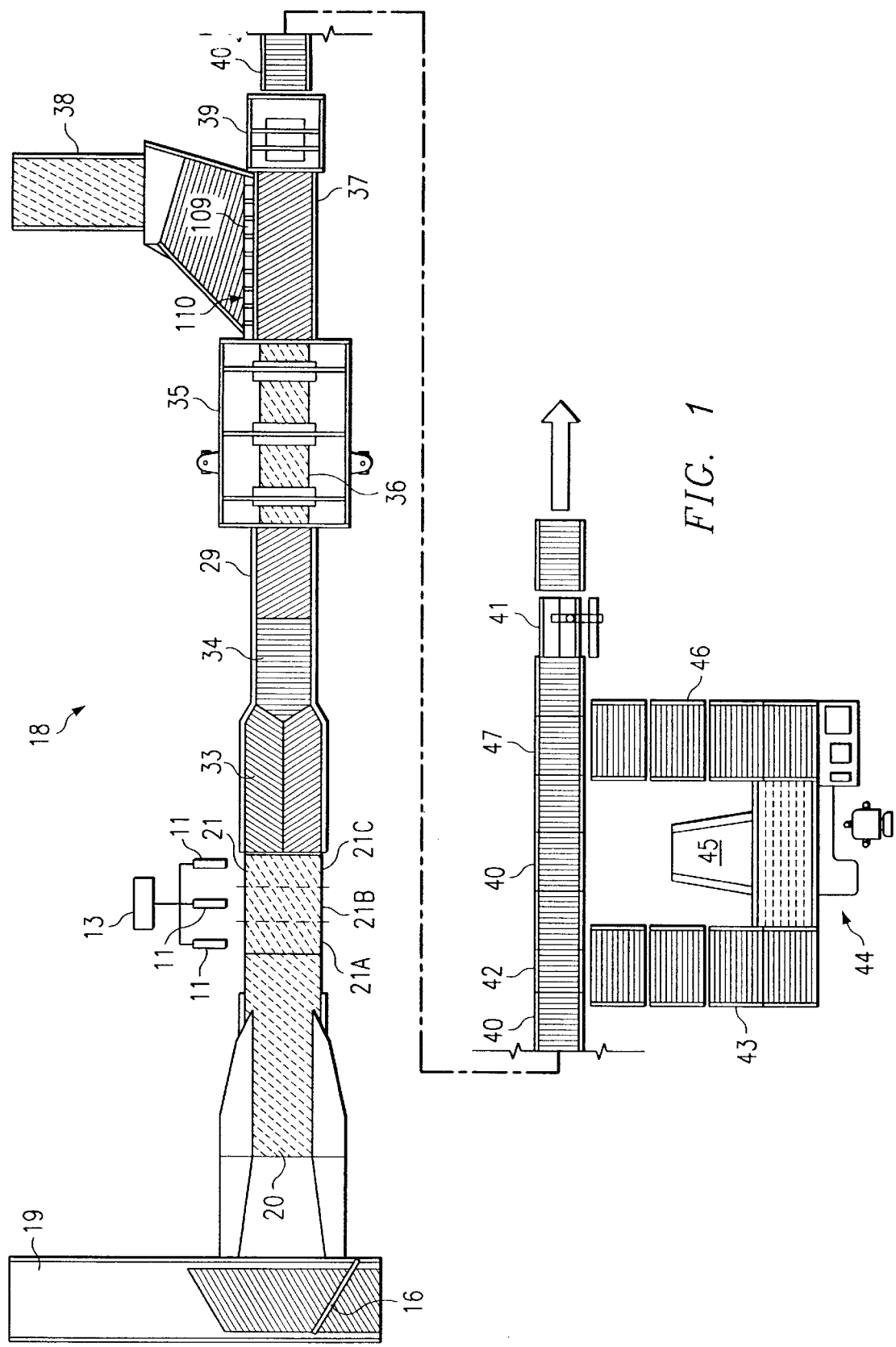
FIG. 1 is a schematic diagram of a feeder-reader subsystem including a chevron singulator according to the invention.

FIG. 1 illustrates a feeder/reader subsystem 18 according to the invention. A continuous flow of material such as parcels is diverted onto a short belt buffer conveyor 20 (single or double) from a parcel belt feed conveyor 19 by means of a right angle transfer mechanism 16, e.g., a set of angled power rollers with a movable gate. Typically, the material is a disordered stream of non-flat, three-dimensional articles that may include overweight articles, oversize articles and clusters of articles that must be separated prior to processing.

An acceleration or infeed conveyor 21 controls the velocity of the product flow into a singulator module 33. Acceleration conveyor 21 may include an inspection camera and a control system that monitors the items entering conveyor 21. As used herein, the term "density" with reference to a stream of articles such as mail pieces refers to the number of articles present in a given area, such as a segment of a conveyor, at a point in time. Items in single file with controlled spacing, which leave chevron singulator module 33 on a transport conveyor 34, are edged on edging conveyor 29 and are subject to bar code scanning in a scanning module 35. Integral with the bar code scanning module 35 is a measure and weigh module 36.

Scanning tunnel 35 is the initial means of identifying the items issuing from the singulator and entering the parcel processing area. Integrated with the scanning tunnel 35 are the measure and weigh functions. Each item is automatically measured and weighed at this point in the induction line to determine whether it must be diverted because of oversize or overweight. These functions are critical in identifying oversize or overweight items as well as limiting the spectrum of items presented downstream to a sorting system such as mail entering the tilt tray conveyor system to those pieces within its operating specification. Information regarding oversized, overweight, and clustered items may be transmitted to an divert controller (not shown) to facilitate diversion.

Oversize or overweight items, which are identified by weighing and measuring outside dimensions, are diverted via a high speed divert module 37 to a conveyor 38 terminating at a transport container bound for the oversize or overweight sorter. Remaining mail flow is introduced to a means of identification such as a parcel address reader (PAR) module 39 that automatically reads destination information from the top or bottom of the item.

Items which have then been identified, either by multi-sided bar code scanning, scanning up to six sides, the parcel address reader 39, or by radio identification (RIDF) patches or tags attached to each item are sent through a series of buffer conveyors 40 directly to a labeler 41. Pieces that cannot be identified either by multi-sided bar code scanning or the parcel address reader are diverted by a divert conveyor section 42 through a series of buffer conveyors 43 to a manual station 44, at which the required information (i.e. address) is read and keyed in by a human operator. Following such manual entry, the item is sent back along a further series of buffer conveyors 46 to a merge section 47, at which point the diverted piece rejoins the main stream and the destination of the item is physically affixed by equipment such as label applicator 41. Thus, following identification by one of the three means described, each item is labeled with destination information on its top face by labeler 41 before induction onto a sorter such as a tilt tray sorter (not shown). The transfer of an item onto a sorter, such as a tilt tray sorter, is carried out in a manner known in the art.

A feeder/reader subsystem 18 such as the foregoing is under computerized central control. The central controller monitors the throughput of the system and tracks each item once it has been identified, e.g., by maintaining in memory a table of data relating to each item in the system between the scanning tunnel 35, where it first becomes possible to identify the item with a destination, and the induction end of the system at which the items are inducted into a sorting device such as tilt tray sorter. Such information is of course communicated to a master control system for the sorter so that the item continues to be tracked by the sorter.

Referring now to the specific components of feeder/reader subsystem 18, it will be noted that the system utilizes a unique chevron singulator 33. Acceleration conveyor 21 may include a vision system including one or more sensing devices such as camera or cameras 11 linked to a control system 13. The vision system determines the number and size of items loaded onto the acceleration conveyor 21.

In one embodiment, the vision system monitor the number and/or size of items or articles present on the input third, 21A, middle third 21B and output third 21C of acceleration conveyor 21. Controller 13 uses this information to control the flow of articles. The number of items present on the input third 21A is used to control the speed of the conveyor or conveyors feeding the acceleration conveyor 21. It the number of articles on input third 21A is too great, the speed of the conveyor or conveyors feeding the acceleration conveyor, for example, conveyors 19 and 20, is slowed. If the number of articles is below the desired number, the speed of the conveyors feeding the acceleration conveyors is increased.

The quantity of articles in the middle third 21B of acceleration conveyor 21 is monitored to insure that the number of articles being transported to the chevron singulator is within the desired range. If the number of articles exceeds the desired number, the controller 13 slows down the conveyors feeding the acceleration conveyor, overriding any speed-up requirement or command based upon the number of articles present on the input third 21A of the acceleration conveyor 21. If the number of articles is below the desired level in the middle third 21 B, no command is issued as the number of articles present on the input third 21A of the conveyor is used to control the maximum speed, e.g. maximum number of articles received from the conveyors feeding the acceleration conveyor.

The number of articles present on the output third 21 C of the acceleration conveyor 21 is used to control the speed of the chevron singulator. Chevron roller speeds can be increased or decreased depending on the number of articles presented at the input of the singulator and the system capacity.

In one embodiment, camera or cameras 11 record images containing, for example, 1,000,000 pixels in a 1024×1024 format. The images are transferred to control system 13 where the images are interpreted to determine the number of packages and the average size of the packages. The control system can utilize this information to regulate the speed of the parcel feeder conveyor 19, buffer conveyor 20, acceleration conveyor 21, singulator 33 and transport conveyor 34.

Singulator 33 comprises a chevron configuration of powered rollers that may be driven in unison but are preferably controllable individually or in groups as described hereafter. The rollers of each half of singulator 33 are angled inwardly so that the items entering the singulator 33 from the conveyor 21 move towards the middle of the singulator as the parcels are transported, effectively assuming a single file formation. Transport conveyor 34 receives the items in single file order and can be used to increase the spacing between each item if operated at a transfer speed greater than the singulator 33. The control system can be used to slow down conveyor 21 if the formation of items on it is dense, giving a greater delay between items as each item enters singulator 33, or to speed up conveyor 21 if the formation of items is sparse, so that overall throughput of the system can be increased without affecting singulation. Transport conveyor 34 deposits singulated, spaced items onto edging conveyor 29. Edging conveyor 29 comprises a series of live rollers mounted in an angled pattern. Edging conveyor 29 "edges" items on the conveyor before the items enter scanning tunnel 35. Edging conveyor 29 may also be utilized as a multiples detection zone. If acceleration conveyor 21 and singulator 33 have failed to provide adequate spacing or separation between any two articles, the items may be electronically flagged for downstream diversion.

In accordance with the invention, an advanced form of singulation which can be adapted to the feeder/reader subsystem of the invention adds intelligent control and the ability to recycle "doubles" or "multiples" using successive coarse and fine singulation operations to improve singulation efficiency. For purposes of the present invention, "coarse" singulation refers to a mechanical process which tends to singulate a stream of items by attenuation of the stream (increase in spacing between items) but which does not track items individually. "Fine" singulation refers to a process wherein individual items traversing the singulator are identified and/or tracked with a detection system such as a vision system, and controls are used to affect the stream in a manner that ensures or at least promotes singulation, for example, by diverting items back to ensure delivery of items from the system one at a time.

Figure 2:
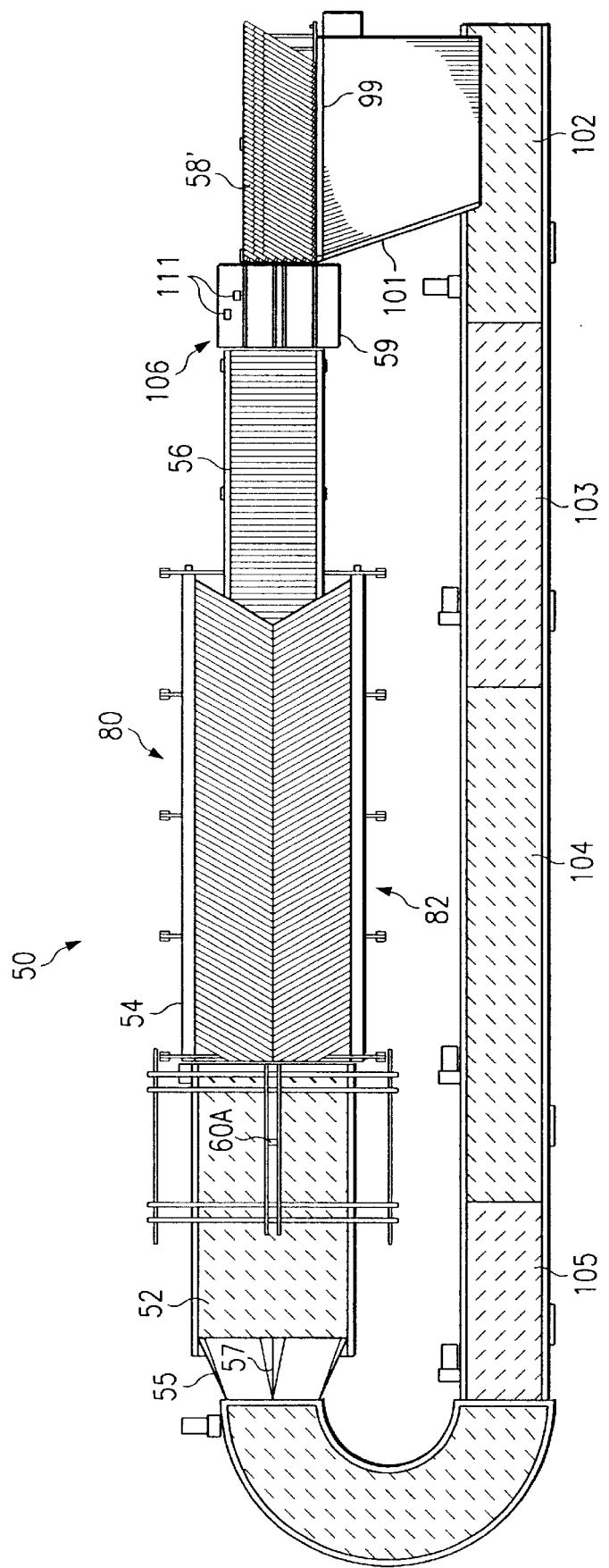
FIG. 2 is a schematic diagram of a recirculating singulation system according to the invention.

Referring to FIG. 2, a singulation and recirculation system or loop 50 includes an acceleration conveyor 52, a chevron conveyor 54, a spacing conveyor 56, a doubles detection conveyor 59, an edging divert conveyor 58, a series of cascaded recirculation conveyors 102–105, and a buffer conveyor 62. The acceleration conveyor 52 may be fed by a slide 55 including a central divider 57 with diverging walls that spread out the congested stream of items. Acceleration of the item stream delivered by buffer conveyor 62 tends to further spread out the formation. Acceleration conveyor 52 may comprise a standard or variable speed conveyor. Singulation loop 50 may be provided with a vision system including a camera 60A mounted over acceleration conveyor 52 for monitoring the density of items 64, with controls for slowing down or speeding up the conveyor 52 as needed.

Figure 3:
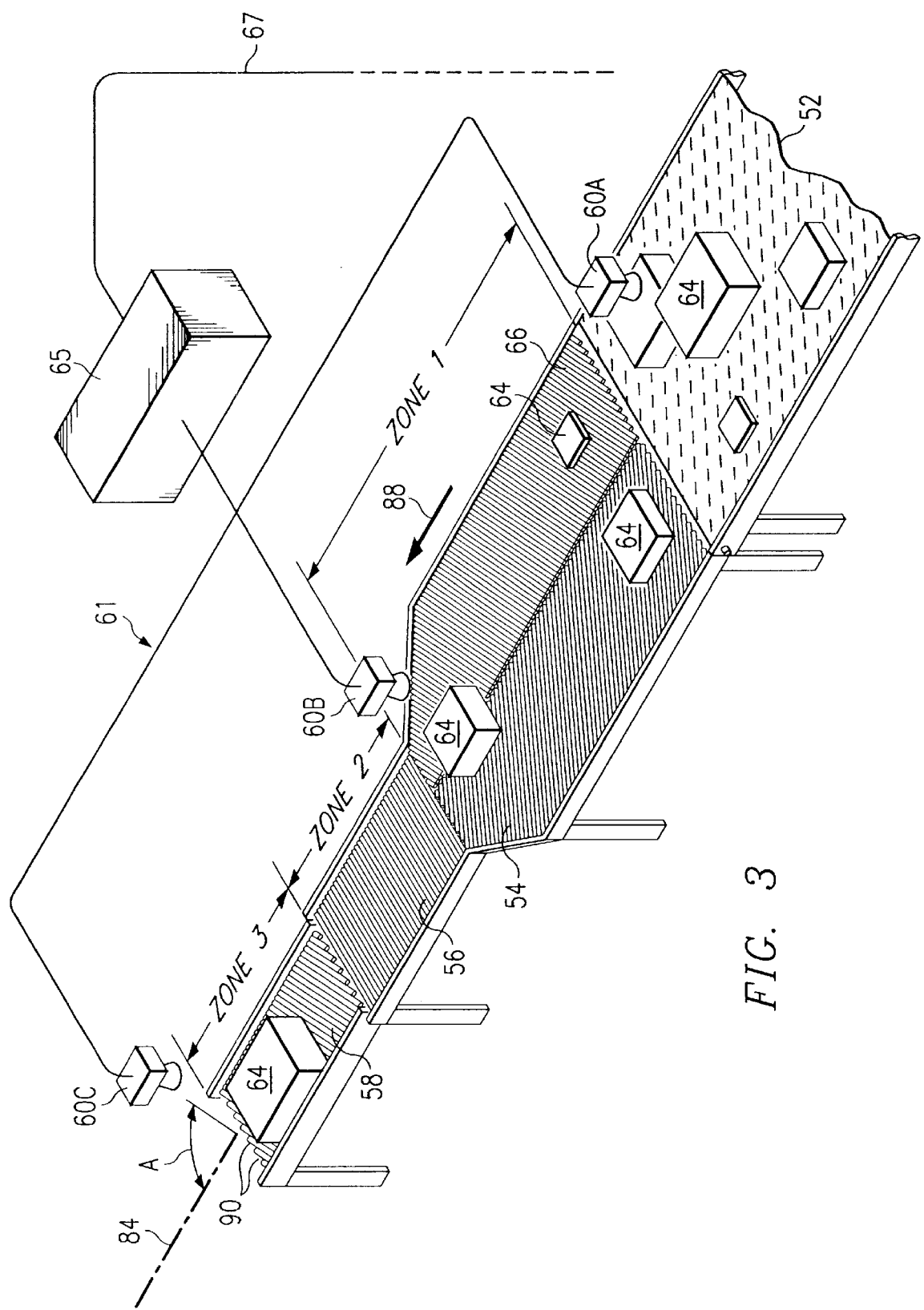
FIG. 3 is a perspective schematic view of a first embodiment of the chevron singulator and a control system for the chevron singulator according to the invention.

FIG. 3 illustrates a more elaborate vision system 61 including cameras 60A, 60B and 60C mounted at or near the center of each conveyor section as shown for evaluating the count, size and location of items processed through the system 50. In this version of the loop, doubles detect conveyor 59 is not interposed between the edging conveyor and the spacing conveyor 56. Vision system 61 enables control of the spacing and orientation of items such as packages 64 by, among other things, continuous adjustment of the velocities of independent groups of conveyor rollers in chevron conveyor 54 and/or the speed at which the other various conveyors operate. Vision system 61 receives and processes images taken from sequential locations with cameras 60 and provides digital feedback to a controller 65 which is in turn connected by a connection 67 to the drive systems of the various conveyors to maintain a controlled flow of items between the buffer conveyor 62, the acceleration conveyor 52, the chevron conveyor 54, spacing conveyor 56 and edging conveyor 58. Cameras 60A–C and associated image processor(s) provide information such as piece count, perimeter, area, centroid, orientation for each item to the controller 65. Based upon this input, the controller 65, continuously or as required, monitors and adjusts the velocity of the roller groups 76 (FIG. 4) of the chevron conveyor 54, the spacing conveyor 56 and the edging conveyor 58 as described hereafter.

Figure 4:
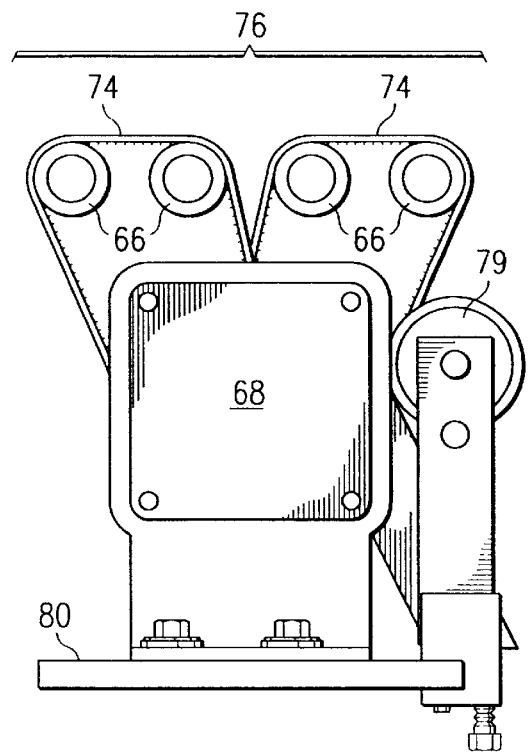
FIG. 4 is an end view of a drive system for a group of rollers used in the chevron singulator of FIG. 2.
Figure 5:
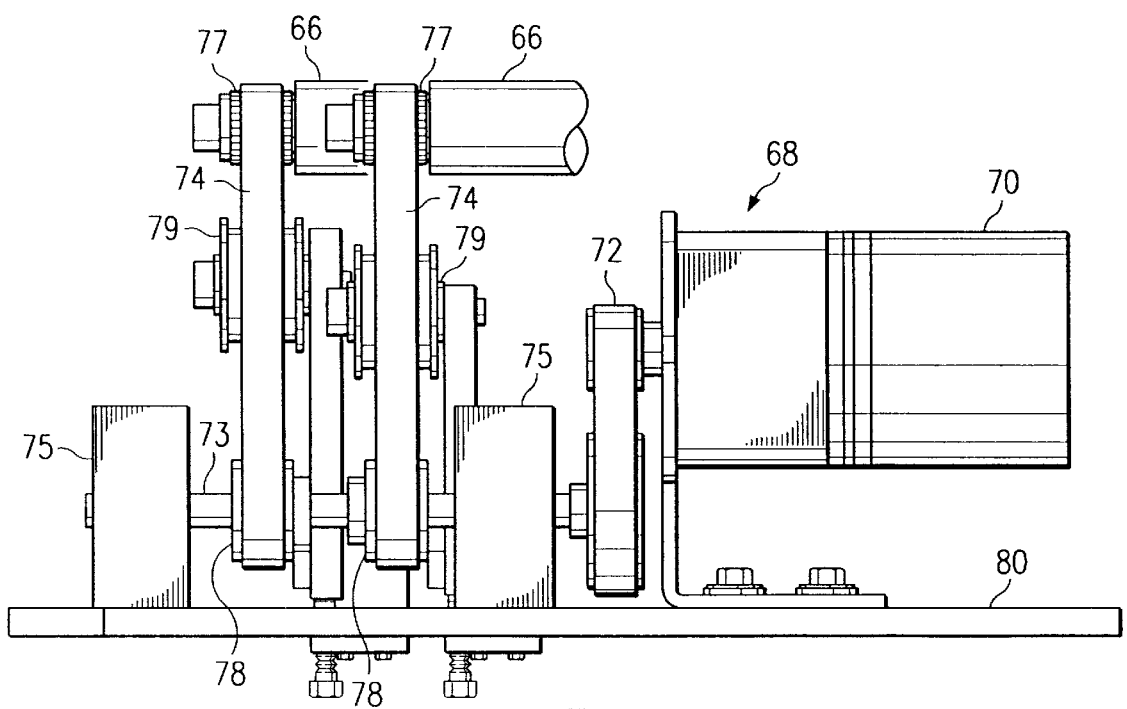
FIG. 5 is a side view of a drive system for a group of rollers used in the chevron singulator of FIG. 2.

Chevron conveyor 54 receives items from acceleration conveyor 52 for singulation. Chevron conveyor 54 includes rollers 66 angled in a herringbone type configuration. As best illustrated in FIGS. 4–7, the powered rollers 66 of chevron conveyor 54 are arranged in groups 76 of four for the purpose of velocity control. Each group 76 of rollers 66 is independently driven by a drive unit 68. Each drive unit 68 includes an electric drive motor 70 (FIG. 5) that drives a timing belt 72. Belt 72 is mounted on associated pulleys and drives a rotary drive shaft 73 mounted in bearings 75. Drive shaft 73 has a pair of spaced drive pulleys 78 thereon on which a pair of drive belts 74 are mounted. As shown in FIGS. 4 and 5, each belt 74 is wound over a grooved bushing 77 at an outside end of each roller 66. Adjustable tensioning rollers 79 engage belts 74 from the side. Drive units 68 and bearings 75 may be secured to a rectangular base plate 80. Drive units 68 and base plates 80 are in turn mounted in a pair of rows along and just beneath the outside of each group 76 of rollers 66. Base plates 80 are mounted at an angle matching that of the associated group 76 of rollers 66.

Groups 76 could, of course, include more or less rollers 66 depending upon the particular application and design constraints. Indeed, it may be sufficient for each half or section to constitute a single group 76, limiting control to speeding up or slowing down one side relative to the other. In one embodiment, the speed range of the roller groups 76 is from 0 to 420 feet per minute, with a power requirement of 15 kW and a noise level less than 70 db. In the alternative, groups of side rail-mounted power rollers like those shown in Kalm et al. U.S. Pat. No. 5,582,286, the contents of which are incorporated herein by reference, could be employed, with a single power roller linked to several slave rollers by O-rings.

Rollers 66 of chevron conveyor 54 preferably comprise left and right sections or halves 82A and 82B that are preferably symmetrical and essentially identical, except that the rollers of left half 82A are angled in opposition to the rollers of right half 82B. Relative to a central longitudinal axis 84 (FIGS. 3 and 6) of chevron conveyor 54, rollers 66 of chevron conveyor 54 define equal included angles 86 and 86' of from about 5 degrees to about 85 degrees, more typically 20 to 60 degrees. Thus, the rollers 66 form a "V" or chevron configuration. In the alternative, the angles of each side need not match, and there could be several more sections of varying angles, and/or a center section that drives items straight ahead flanked by two angled sections substantially as shown.

In operation, an item 64 deposited upon chevron conveyor 54 at any location along its width will move inwardly toward central longitudinal axis 84 as the item is transported along the length of the chevron conveyor in the direction designated by the arrow in FIG. 3. Thus, the spread out stream of items 64, conveyed from acceleration conveyor 52 onto chevron conveyor 54, will be urged into a single stream of items 64, which may however end up spaced relatively close to one another as each item migrates towards the center.

Figure 7A:
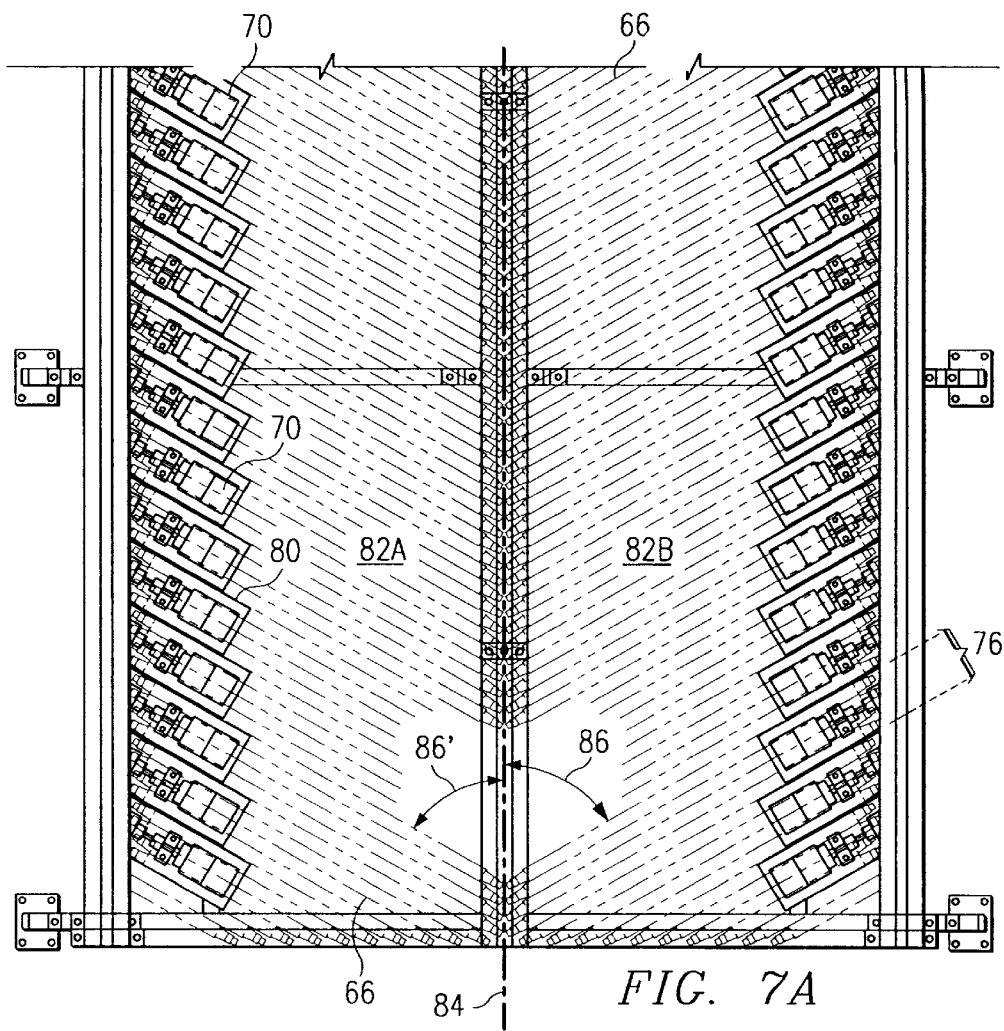
Figure 6:
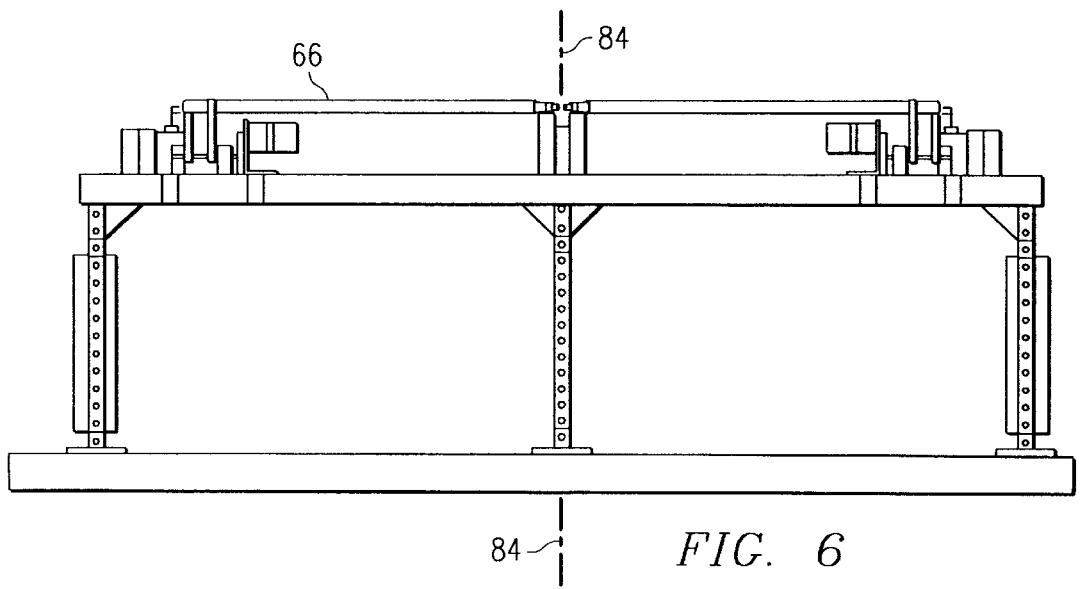
FIG. 6 is an end view, partly broken away, of the chevron singulator of FIG. 2.

As noted above, the formation of a singulated stream of items occurs as a result of the V-shaped or chevron geometry of the rollers 66 in connection with the direction of rotation as indicated by arrow 100 (FIG. 7B). As illustrated by arrow 100, the rollers 66 of each half of the chevron conveyor turn toward the centerline of the conveyor 54. The formation of a singulated stream occurs even when the chevron conveyor is operating without the benefit of computer control over the speed of the rollers 66 or the rate at which packages are fed onto the chevron conveyor 54 by acceleration conveyor 52. However, according to a preferred aspect of the invention, vision system 61 and controller 65 can be used to further enhance the ability of the chevron conveyor 54 to singulate a stream of packages.

Controller 65, (FIG. 3) which may be a programmable logic controller (PLC), is set to a predetermined target spacing between packages. Vision system 61 and camera 60B return images of packages 64 on the chevron conveyor 54, and the position of each such package is computed. The projected path of each package on chevron conveyor 54 may then be estimated based on the current speeds of the roller groups 76 along such path. Where a collision or inadequate spacing is predicted, controller 65 slows or stops rollers in the path of the one of the packages while the other goes through. If packages 64 are being introduced on the chevron conveyor 54 too fast for the system to singulate, then controller 65 sends a feedback signal to the acceleration conveyor 52, slowing or stopping the introduction of new packages 64 onto the chevron conveyor 54 until the number of packages on chevron conveyor 54 reaches a predetermined normal level.

The singulated stream of items 64 is deposited upon spacing conveyor 56 by chevron conveyor 54. Spacing conveyor 56 includes a plurality of live rollers 88 deployed in a standard (non-angled) conveyor configuration. Rollers 88 of spacing conveyor 56 may be divided into independently controlled groups 83 comparable to groups 76 described above. The operating velocity of each roller group 83 may be continually adjusted to produce a stream of items conforming to required spacing parameters. Thus, if control of chevron conveyor 54 is insufficient to produce desired spacing between items 64, and camera 60C detects a pair of items 64 that are too close together, then controller 65 can increase such spacing by operating roller groups 83 to either slow one item down, speed the other up, or both in order to correct the situation.

Figure 3A:
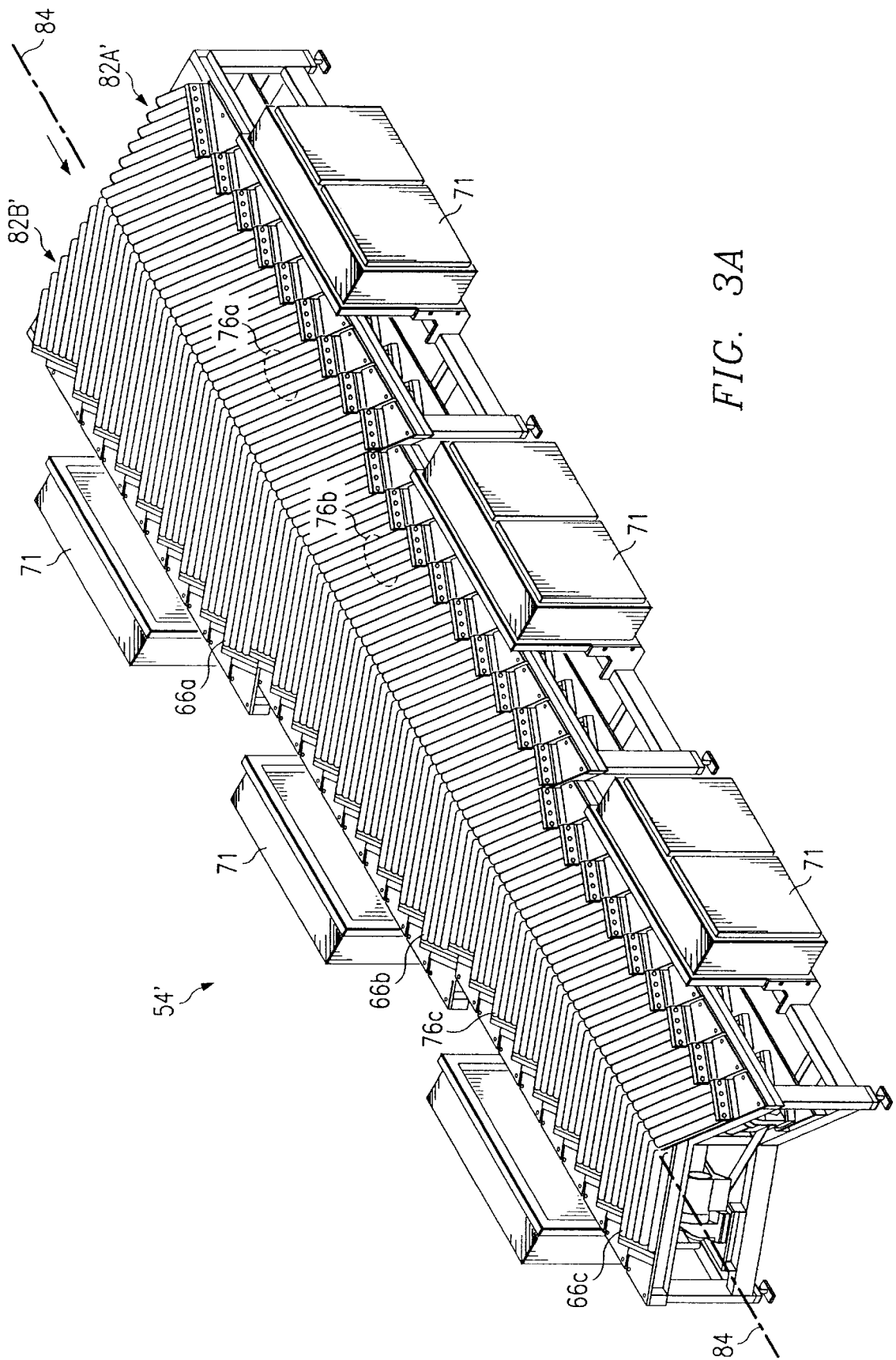
FIG. 3A is a perspective view of a second embodiment of a chevron singulator.

Turning now to FIG. 3A there is illustrated a second embodiment 54' of chevron singulator of FIG. 3. As set forth above, items deposited upon chevron conveyor 54' at any location along its width will move inwardly toward central longitudinal axis 84 as the items are transported along the length of the conveyor in the direction designated by the arrow. Since the spread out stream of items will be urged into a single stream of items, it may, depending on the system capacity and design factors, be possible to narrow the conveyor in order to reduce equipment costs and space required for the conveyor. As illustrated, singulator 54' includes a series of rollers 66a, 66b, and 66c, which become progressively narrower in the direction of travel, indicated by the arrow, of a stream of items being singulated.

As in the case of singulator 54 of FIG. 3, rollers 66a, 66b and 66c of chevron conveyor 54' comprise left and right sections or halves 82A' and 82B' that are preferably symmetrical and essentially identical, except that the rollers of left half 82A' are angled in opposition to the rollers of right half 82B'. Rollers 66a, 66b and 66c are arranged in independently driven groups 76a, 76b and 76c, which may independently controlled to vary the speed of the rollers along the length of the conveyor. The controls and drive units for the rollers may be enclosed in cabinets 71, spaced along the length of the singulator 54'. It will be appreciated that the control system illustrated and described in connection with FIG. 3 is equally applicable to singulator 54'.

Figure 8:
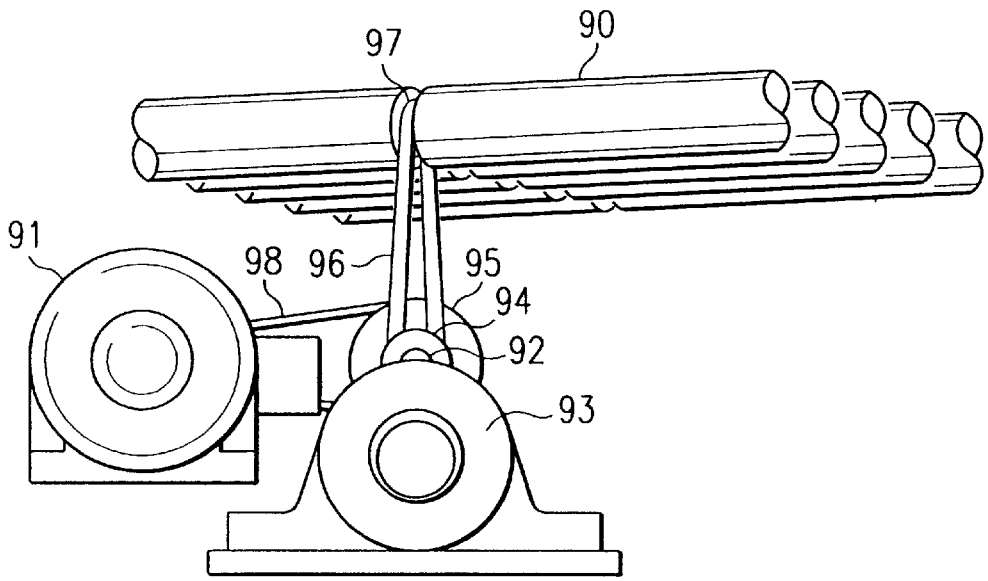
FIG. 8 is a partial end view of the edging conveyor of FIG. 2.
Figure 9:
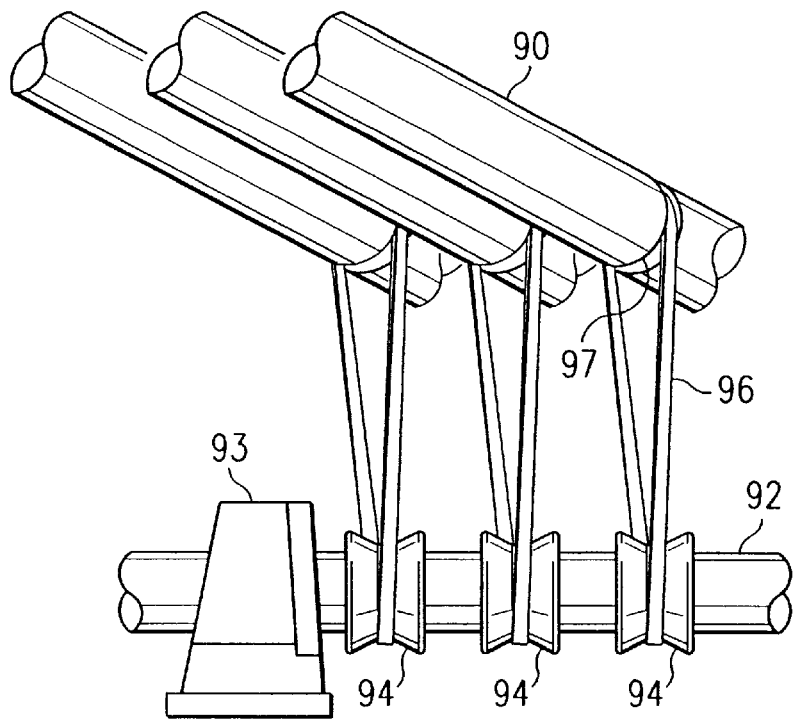
FIG. 9 is a partial side view of the underside of the edging conveyor of FIG. 2.

Referring now to FIGS. 8 and 9, edging conveyor 58 includes a plurality of live rollers 90 mounted at an angle relative to the widthwise direction of the conveyor. Unlike chevron conveyor 54 and spacing conveyor 56, the rollers 90 of the edging conveyor run in unison. For this purpose, as shown in FIGS. 8 and 9, an electric motor 91 turns a drive shaft 92 by means of a drive belt 98 mounted on a drive pulley 95. Drive shaft 92 extends beneath conveyor 58 along its length and is mounted for rotation in a series of spaced bearings 93 mounted to the floor or frame of the conveyor. A series of pulleys 94 are mounted in spaced positions along the length of drive shaft 92. Elastomeric drive bands 96 are wound under tension onto circumferential grooves 97 on the outsides of rollers 90 and around pulleys 94, so that each roller 90 is directly driven and all are driven at a uniform speed. This is consistent with the function of edging conveyor 58, which is to move all items to one side.

In the embodiment of FIG. 3, edging conveyor 58 edges each item before it enters an identification device or means such as bar code scanning tunnel (not shown) just downstream. In addition, edging conveyor 58 can be used as the location for multiples detection. In the event that chevron conveyor 54 and spacing conveyor 56 fail to produce adequate spacing between any two items 64, the items 64 can be electronically flagged for downstream diversion and processing. As illustrated, rollers 90 define an included angle A with the common central longitudinal axis 84 of conveyors 54, 56 and 58. Angle A is not critical and may vary from about 10 to 85 degrees, more typically 20 to 60 degrees depending upon the particular application and design constraints.

As shown in FIG. 2, an improved edging divert conveyor 58' of the invention includes a gate 99 which forces items 64 to remain on conveyor 58 and slide along gate 99. When gate 99 is moved, retracted vertically or drawn to one side, a item 64 identified as overweight, oversized or other identified and selected for diversion will pass through the now open gate and be diverted down a chute 101 which may be a slide, conveyor, or an inclined series of powered or unpowered rollers, to the first of a series of cascaded conveyors 102–105 as described hereafter. Gate 99 may be a solenoid-actuated, flexible or rigid panel that slides in a groove, such as the one illustrated in Kalm et al. U.S. Pat. No. 5,582,286.

The edge divert shown has potentially numerous applications in the feeder/reader subsystem as well as other bulk item processing areas. According to a one form of the invention, the edging rollers are combined with a segmented retractable rail 110 (FIG. 1) to form a unique divert apparatus. For items not requiring diverting, the segmented retractable rail 110 remains stationary. For items such as parcels, boxes and bundled mail, that must be diverted, the segments 109 retract in front of the parcel and are extended immediately behind it by the control system. The component of force applied to the item by the edging rollers in the transverse direction causes items in the stream to be pushed toward the edge of the conveyor and exit when a rail segment 109 is actuated to the open position. In one embodiment, rail segments 109 are actuated via air cylinders located underneath. An individually controlled actuator may be associated with each rail segment. Segments 109 preferably overlap one another in the conveying direction to reduce the possibility of "hang-ups", i.e., items that catch on a segment and are not diverted.

Items are introduced to the edging divert conveyor primarily in a singulated state with controlled spacing. In some cases, two pieces may be consecutive upon entering the divert, as in the case of "doubles" or "multiples." The edger controller (not shown) is provided with the geometry, size and/or weight of each piece before it enters. Upon entering the divert, the edging rollers 90 cause each item 64 to contact and then slide against the retractable rail 110. Based on the size information and the speed of travel of the item, the controller creates a timing sequence for retracting and extending each segment 109. The force applied to the item by the edging rollers causes the item to exit over the retracted segments.

Diverted items 64 may be those which are detected as "doubles" or "multiples," namely two or more items overlapping or too close together. For this purpose doubles detection conveyor 59 may be placed immediately upstream from edging conveyor 58' as shown in FIG. 2 and receives items 64 from spacing conveyor 56. Eliminating doubles and multiples, e.g. clusters of two or more items that are side by side or consecutive without sufficient spacing, is a key element of bulk item handling automation. A method for detection of doubles according to the present invention involves capturing top and profile images of items 64 while in motion on conveyor 59, evaluating the images using a simple algorithm to test for doubles, and comparing images against a database to determine destination, i.e., whether or not the items imaged will be passed on or diverted off of the feeder line. Preferably, conveyor 59 according to the invention is a powered roller conveyor with variable speed capability. A vision system 106, which may be part of system 61 or self-contained, includes two or more digital cameras 111 that acquire images from above the conveyor and from the sides.

Figure 13C:
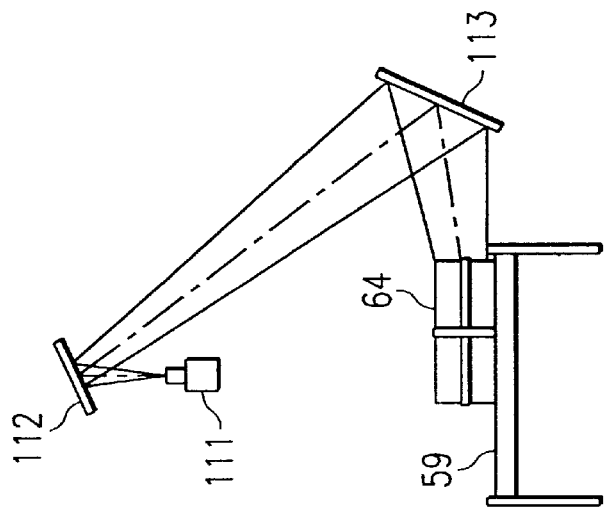
FIGS. 13A, 13B and 13C are schematic diagrams of an alternative vision system according to the invention in three different viewing positions.
Figure 13B:
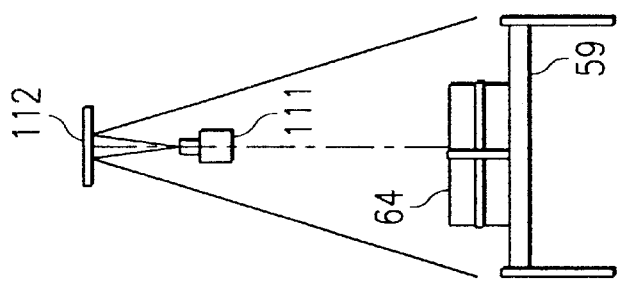
Figure 13A:
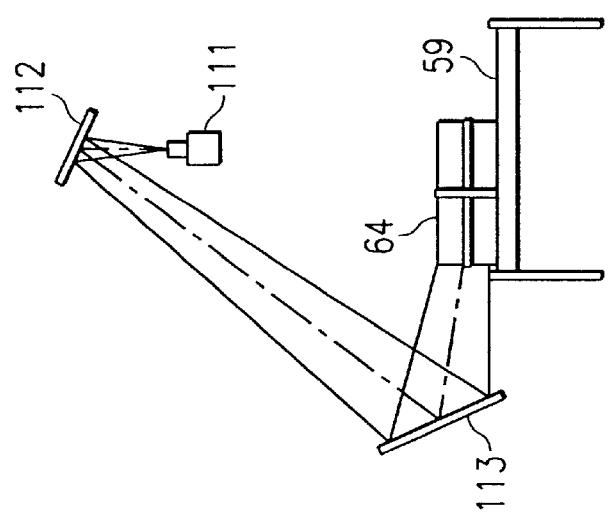

As an alternative to using three, or multiple cameras a single, upwardly directed camera 111 with zoom capability is shown in FIGS. 13A–13C. A tiltable mirror 112 cooperates with angled mirrors on either side of the conveyor to record images from the top and both sides. It has been found further that greater doubles detection accuracy results from imaging the upper surface of the doubles detect conveyor at a substantial distance, e.g. 20 feet or more, to reduce parallax errors. Parallax errors can also be reduced by using multiple mirrors and/or curved mirrors.

A singulated item stream containing doubles enters the doubles detect conveyor 59 at a known speed. Images of the top and side view of the items 64 are continuously updated. A doubles detect controller receives the digital images and extracts the number of corners in view for use as a process variable. The algorithm for the image taken from the top is as follows. If the number of corners is four, the item is released to the mail stream. If the number of corners is greater than four, geometry data related to the item such as area, centroid, and edge lengths is stored in a short-term database. The item is electronically flagged, diverted and recirculated. For subsequent items that have more than four corners, the controller compares the geometry data for the item with geometry data in the database. If a match is found, it is assumed the item 64 has a non-rectangular shape but is not a double, and is therefore released to the mail stream. The algorithm for the image taken from the side is similar. As noted above, a pair of items 64 too close together may also be flagged for diversion.

Other useful vision systems include a line scan system wherein the camera position at a gap between two conveyors creates a scrolling image of objects that pass by. Such a system is further described in commonly-assigned U.S. Ser. No. 09/540,371, filed Mar. 31, 2000, the entire contents of which is incorporated by reference herein for all purposes. This patent application also describes, for example, several alternative hold and release mechanism which could be used as the fine singulator of the present invention.

When the item enters edging conveyor 58', gate 99 is opened if the item or items have been flagged for diversion, and is shut if the item has been successfully singulated. Items 64 that are not diverted continue on to the next processing station, preferably a six sided bar code scanning tunnel such as tunnel 35 of FIG. 1. Conveyor 102 receives items 64 from slide 101 and may also receive new items 64 from, for example, a buffer conveyor such as conveyor 20 in FIG. 1 or alternatively, a RFID reading station (not shown).

Figure 10:
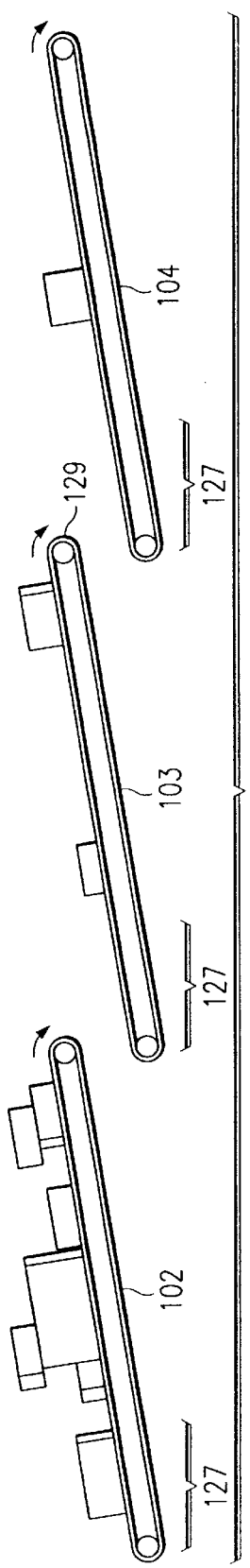
FIG. 10 is a schematic side view of the cascaded conveyors of FIG. 2 (not to scale)

During circulation, measures may be taken to encourage doubles or multiples to separate or break up. Dropping a cluster of items a short distance from one conveyor to another, especially using a series of conveyors moving at progressively greater speeds, will typically achieve this effect. As shown in FIGS. 2 and 10, one form of cascaded conveyor singulator and doubles separator according to the invention is a series of conventional belt conveyors 102, 103, 104 and 105 each disposed at an angle slightly greater than horizontal (e.g., 5 to 30 degrees, depending on the length of each conveyor) so that the exit end of each conveyor is slightly above the entry end of the next conveyor. In this manner, items 64 moving along the cascaded conveyor system fall a short distance from one conveyor to the next, which action tends to occur one item at a time as the center of mass of each item reaches its critical position on the end of the conveyor. The vertical distance is preferably not so great that the chance damage to the contents of an item such as a parcel increases.

As illustrated, ramped conveyors 102, 103, 104 and 105 each include a lower article receiving area 127 and an upper discharge end 129. As best shown in FIG. 10 a stream of articles is discharged from the upper discharge end 129 of, for example, conveyor 102 onto the receiving area 127 of succeeding conveyor 103. As the stream of articles falls, clusters of articles will tend to separate and this effect is enhanced if conveyor 103 is operating at a higher speed than preceding conveyor 102. Thus, each successive conveyor 103–105 is preferably operated at a slightly greater speed than the preceding conveyor in order to progressively increase spacing of the mail stream.

As noted above, when a double or cluster of items encounters the edge of one of the conveyors, the act of falling to the next level tends to separate the double or cluster of items. To increase the likelihood that a double or cluster will not remain after the transfer, according to a further aspect of the invention, each progressive conveyor can be set at an angle in the horizontal plane relative to the one preceding it, such as a right angle as shown in FIG. 14, or an angle in the range of from 5–90 degrees, especially 10–70 degrees, as shown in FIGS. 15A to 15D. Following this process, the items 64 are passed to curved belt buffer conveyor 62 ready to be introduced to the acceleration conveyor 52.

Figure 11:
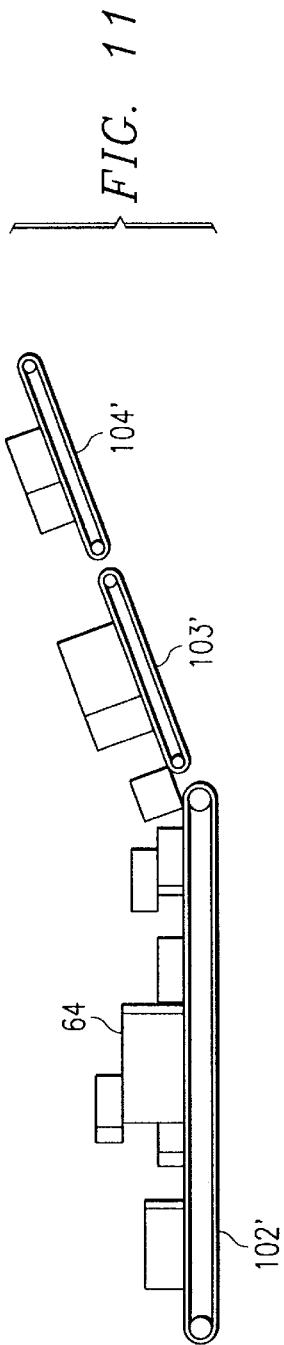
FIG. 11 is a schematic side, view of an alternative form of singulation system to the cascaded conveyors of FIG. 10.
Figure 12:
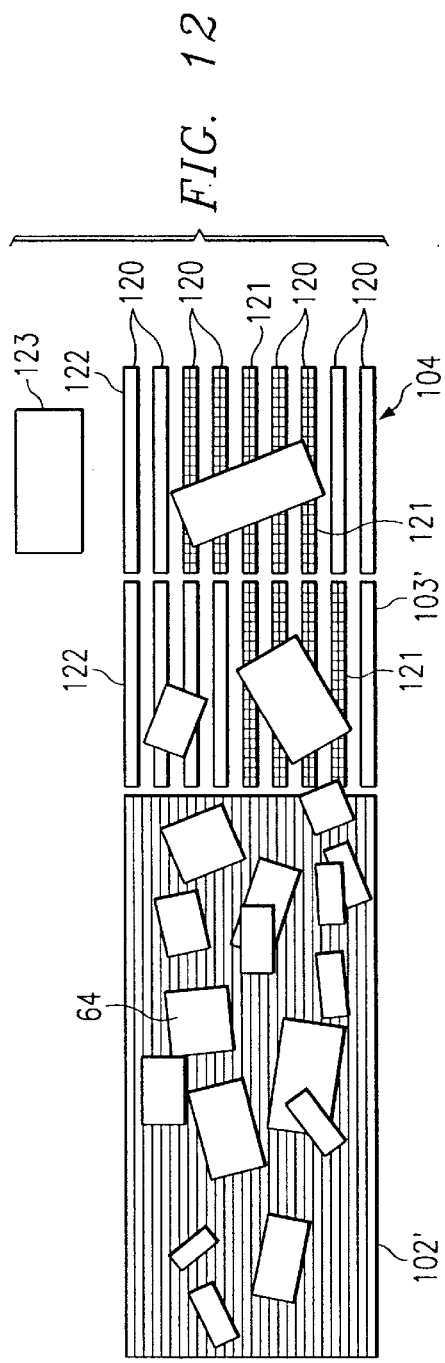
FIG. 12 is a schematic top view of the singulation system of FIG. 11.

FIGS. 11 and 12 illustrate an alternative form of cascaded conveyor system wherein a first, essentially horizontal conveyor 102' feeds to a series of inclined conveyors 103', 104' that form an upward ramp. The crossovers from one inclined conveyor to another help segregate items that are lined up in the lengthwise (conveying) direction. In one embodiment, inclined conveyors 103', 104' each include a plurality of parallel longitudinal conveying sections comprising parallel strip belts 120. The belts 120 of the ramped conveyors 103', 104' are controlled individually so that some parcels or items are moving upwards on active belts 121 while others remain stationary on idle belts 122. Belts 120 can be controlled by a vision and control system 123 as described herein that identifies the lead parcel for each section and the belts which support items, running those while others remain idle. The vision and control system 123 may also be used to detect doubles and operate selected belts 120 to separate clustered items.

In the alternative, of course, the control features can be omitted and the conveyors 102'–104' run in much the same manner as described for conveyors 102–104, that is, the embodiment of FIGS. 11 and 12 is capable of being used for either fine or coarse singulation depending on how it is implemented (e.g., the number and spacing of belts) and whether or not it is provided with a control system and vision or other form of item detection system. The same is true of the chevron singulation system using angled sets of rollers described above, which tends to form a group of items into a single file even when operating without any vision or control system.

When used as part of a feeder/reader subsystem as shown in FIGS. 1A, 1B, the foregoing recirculation loop would be positioned as indicated to replace singulator 33 and conveyor 34. In this connection, it should be noted that the edging divert module 37 following the scanning tunnel 35 or alternatively, an RFID station, may have essentially the same construction as the edging divert conveyor 58', but is controlled differently, namely to divert objects which prove to be non-machinable based on weight and/or size as measured in tunnel 35. In the alternative, an arrangement could be employed wherein the scanning tunnel 35 receives mail pieces 64 directly from the doubles detection conveyor 59, and the edging divert conveyor 58' is located immediately downstream from scanning tunnel 35.

FIG. 14 illustrates one such alternative form of recirculation loop according to the invention. Return conveyors 102–105 are at right angles at the turnaround end of the loop to provide better break-up of piled mail pieces, and the high speed divert 37' has a dual function. A double gate mechanism 99' is provided for the divert mechanism with dual exit paths or slides 101A, 101B whereby items rejected as doubles can be recirculated, and items rejected as oversize or overweight can be removed from the system entirely, saving the expense of having two divert conveyors.

It will be understood that the foregoing description is of preferred and exemplary embodiments of the invention. For example, although the system and methods of the invention have been described with reference to items such as mail pieces, it will be apparent that other essentially three-dimensional objects, products or items could be fed and singulated in the manner described. (For purposes of the invention, letters and other thin mail pieces ("flats") are considered essentially two-dimensional.) Additionally, while coarse and fine singulation operations have been described primarily in connection with the separation of doubles, it will be appreciated that the successive coarse and fine singulation steps could be performed in a different order. For example, a series of cascaded angled or non-angled conveyors could be utilized as an initial singulation step, followed by a fine singulation step, utilizing a chevron, hold-and-release, or strip belt singulation as disclosed herein. Thus, it will be appreciated that the invention is not limited to the specific forms shown, but is limited only by the scope of the invention as expressed in the appended claims.

What is claimed is:

1. An apparatus for feeding a stream of articles to a sorter comprising;

an infeed conveyor;

a detection system configured to determine the spacing and number of articles on the infeed conveyor, the detection system controlling the rate at which articles are loaded onto the infeed conveyor, the detection system comprising a vision system which monitors the number of articles present in each of a plurality of areas of the infeed conveyor;

a singulator, the singulator receiving a disordered stream of non-flat, three dimensional articles from the infeed conveyor and spacing the articles for transfer from the singulator one at a time;

a scanner, the scanner receiving articles from the singulator and scanning a plurality of sides of the article for destination indicia, the scanner generating a signal corresponding to the scanned indica; and a diverter, the diverter directing selected articles in response to the signal generated by the scanner.

2. The apparatus of claim 1 further comprising an edger, the edger receiving the stream of articles from the singulator, positioning the articles for scanning by the scanner, and passing the stream of articles to the scanner for scanning.

3. The apparatus claim 1 further wherein the scanner comprises a tunnel-type scanner, the tunnel type scanner scanning a plurality of sides of each item in the stream of articles passing through the scanner.

4. The apparatus of claim 3 wherein the scanner further comprises weight and size detectors and wherein articles exceeding predetermined physical criteria are diverted in response to signals from the detectors.

5. The apparatus of claim 1 further comprising at least two, first and second cascade conveyors disposed head end to end so that articles leaving the first conveyor are received by the second, wherein the second conveyor is moving at a greater speed than the first conveyor.

6. The apparatus of claim 1 further comprising a sorter, the sorter sorting articles in the stream in response to information collected by the scanner.

7. The apparatus of claim 1 further comprising a controller, the controller regulating the rate at which articles are loaded onto the conveyor and controlling the speed of the singulator.

8. The apparatus of claim 1 wherein the vision system monitors at least each of an input section and an output section of the infeed conveyor.

9. The apparatus of claim 8 further comprising a controller, the controller regulating the rate at which the articles are loaded onto the acceleration conveyor based on the number of articles in the input section of the acceleration conveyor detected by the vision system.

10. The apparatus of claim 9 wherein the controller controls the speed of the singulator based upon the number of articles detected in the output section by the vision system.

11. A method of feeding a stream of articles to a sorter comprising:

directing a disordered stream of non-flat, three dimensional articles onto an infeed conveyor;

utilizing a vision system to determine the spacing and number of individual articles in each of a plurality of areas on the infeed conveyor as the stream of articles is conveyed with the infeed conveyor;

controlling the rate at which articles are loaded onto the infeed conveyor based upon the number and spacing of articles present in less than all of the areas monitored by the vision system;

conveying the disordered stream of non-flat, three dimensional articles from the infeed conveyor to a singulator, singulating the stream and directing the singulated stream of articles from the singulator to a scanner;

scanning a plurality of sides of articles comprising the stream for destination indicia;

generating a signal corresponding to scanned indicia; and diverting selected articles in response to the signal generated by the scanner.

12. The method of claim 11 further comprising further comprising edging the stream of articles with an edger prior to scanning the articles.

13. The method of claim 11 wherein scanning the articles comprises scanning a plurality of sides of each article.

14. The method of claim 13 wherein the articles are scanned utilizing a tunnel-type scanner configured to scan six sides of articles passing through the scanner.

15. The method of claim 11 further comprising directing articles from the scanner along a path to a sorter, the sorter sorting articles in the stream in response to information collected by the scanner.

16. The method of claim 11 further comprising imaging the stream of articles with a camera to detect clusters of articles in the stream.

17. The method of claim 11 wherein the scanner further comprises weight and size detectors and wherein the method further comprises detecting and diverting articles exceeding preselected physical criteria.

18. The method of claim 11 further comprising controlling the rate at which articles are loaded onto the infeed conveyor based upon the number of articles present on an input section of the infeed conveyor and controlling the speed of the singulator based upon the number of articles detected in an output section of the infeed conveyor.

* * * * *